March 5, 1935.  H. GOLDBERG  1,993,368
FITTING FOR FLEXIBLE SHAFT CASINGS
Filed June 22, 1931
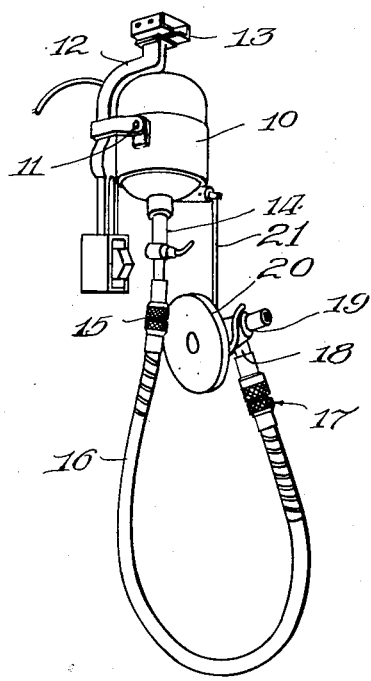
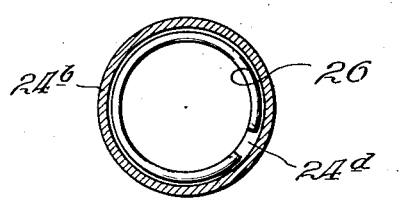
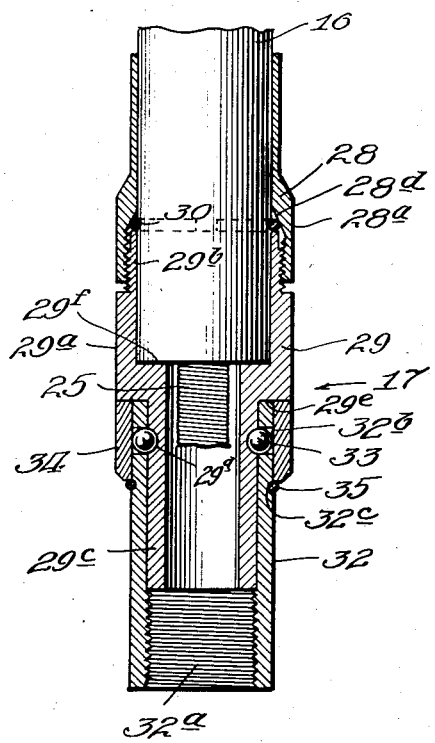
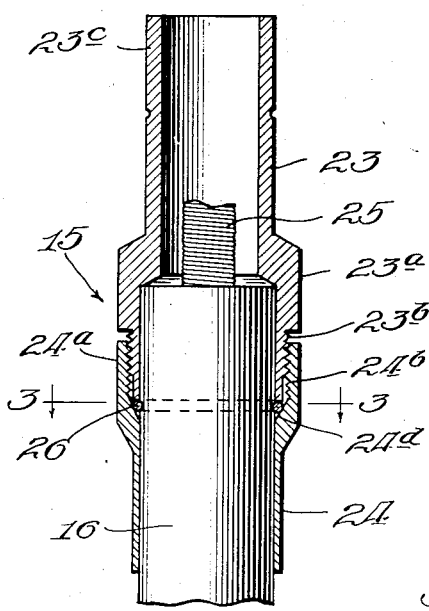
Inventor:
Herman Goldberg
by Rector, Hibben, Davis & Macauley,
Attys

UNITED STATES PATENT OFFICE 1,993,368

FITTING FOR FLEXIBLE SHAFT CASINGS

Herman Goldberg, Chicago, Ill.

Application June 22, 1931, Serial No. 545,893

4 Claims. (Cl. 64—30)

This invention relates to fittings for flexible shaft casings and its purpose is to provide an improved fitting which will permit the convenient attachment of the ends of the casing to the devices which operate or are operated by the flexible shaft while at the same time permitting the universal movement of at least one of these devices with respect to the casing. Flexible shafting is now commonly employed for a wide variety of uses and it is usual to drive one end of the shaft by an electric motor or the like and to connect the other end of the shaft to a hand-manipulated device or tool, such as a polishing implement, for example, which is moved about by the operator and which must assume a great variety of positions during its operation. It is desirable to enclose this flexible shaft in a flexible casing having its ends connected to the casing of the manually operated implement and to the casing of the driving motor, for example, and it has been found that the hard usage to which these sets of apparatus are put often results in the rapid deterioration of the end portions of the casing and the severing of their connections with the motor or implement casings to which they are ordinarily connected. This has heretofore necessitated the replacement of the entire casing with its end fittings or the return of the damaged casing to the factory for the repair of the end portions thereof, thus necessitating great delay and expense and causing great loss to those whose tools are rendered idle during this period.

The principal object of the present invention is to overcome the above mentioned difficulties by providing an improved form of fitting for flexible shaft casings which may be readily detached by the workman in the shop and which may be readily replaced by him upon a new shaft casing. A further object of the invention is to provide an improved and simplified form of fitting for shaft casings which will permit a free universal movement of the manually operated implement which is attached to the end of the casing and which may be continued in operation for long periods of time without the development of looseness or end-play in its parts. Another object of the invention is to provide an improved fitting for shaft casings having novel means by which the fitting is clamped on the end of the casing. Other objects relate to various features of construction and arrangement which will appear more fully hereinafter.

The nature of the invention will be understood from the following specification taken with the accompanying drawing, in which one embodiment is illustrated. In the drawing, Fig. 1 shows a perspective view of a motor driven tool having the driving shaft thereof enclosed in a casing equipped with the improved fittings of the present invention;

Fig. 2 shows a longitudinal vertical section through the fitting which is employed at the upper end of the flexible shaft casing for connecting it with an extension of the casing of the driving motor.

Fig. 3 is a sectional view taken on the line 3—3 of Fig. 2; and

Fig. 4 is a vertical longitudinal section similar to that of Fig. 2, illustrating the form of fitting which is employed for connecting the lower or free end of the flexible shaft casing with the casing of the hand-operated tool or implement.

The apparatus illustrated in Fig. 1 comprises an electric motor 10 mounted with its shaft extending vertically and having its casing pivotally connected at 11 to a hanger 12 which may be provided at its upper end with a head 13 adapted to slide along a trolley and having contact plates for making connection with supply conductors associated with the trolley so that the motor may be conveniently moved about to various positions over a work bench, for example. The shaft of the motor extends downwardly through a casing extension 14 and the lower end of this casing 14 is connected to a fitting 15 constructed according to the present invention. This fitting 15 unites the casing 14 with the flexible shaft casing 16 which contains the flexible shaft having a connection with the motor shaft located in the casing 14. The flexible casing 16 is connected through another fitting 17, embodying the present invention, with the casing 18 of a hand tool 19 which in this instance is illustrated as a polishing device equipped with a polishing wheel 20 driven by the flexible shaft which extends through the casing 16. The casing 18 of the polishing tool is ordinarily supported upon a hook 21 which is pivotally suspended from the casing of the motor 10.

The construction of the fitting 15 is illustrated particularly in Fig. 2, where it is illustrated as comprising an upper sleeve 23 and a lower sleeve 24 through which extends the flexible shaft 25. The lower end of the sleeve 23 is enlarged and has an externally knurled surface 23ª, while the lower sleeve 24 is enlarged at its upper end and is similarly provided with an externally knurled surface 24ª. These roughened surfaces permit the parts to be engaged by the fingers of the workman so that they may be relatively rotated for the purpose of engaging or disengaging the two sleeves which have a telescoping threaded engagement with each other due to the provision on the sleeve 23 of an externally threaded extension 23$^b$ which telescopes within and threadedly engages the internally threaded enlarged portion 24$^b$ of the lower sleeve. The upper portion 23$^c$ of the upper sleeve is adapted to be clamped or otherwise secured to the casing 14 which extends downwardly from the motor. The lower portion 23$^b$ of the upper sleeve and the lower portion of the sleeve 24 are adapted to receive the flexible shaft casing 16, the outer portion of which is ordinarily formed as a vulcanized tubular rubber body reenforced by strands of cord or fabric embedded therein and protected on its inner side by a metallic sheath within which the shaft 25 is mounted. The shaft casing 16 is extended into the sleeves 23 and 24 and is held in position therein by an annular split ring 26 having the form illustrated particularly in Fig. 3. The lower end of the enlarged portion 24$^b$ of the lower sleeve 24 is provided with an annular downwardly and inwardly inclined wedging surface 24$^d$ and the split ring 26, engaging this surface, is compressed and forced inwardly by the engagement therewith of the lower end of the externally threaded projection 23$^b$ on the upper casing. This causes the split ring to indent or bite into the rubber of the casing 16 so that this casing is then held firmly in position within the fitting and is thus united rigidly at its upper end with the casing 16 of the motor. In assembling the fitting 15 on the upper end of the flexible shaft casing 16, the end of the casing is first inserted through the sleeve 24 to project some distance above the upper end thereof and then, after placing the split ring 26 in position in the annular recess which is thus formed in the upper end of the sleeve 24 around the casing, the upper sleeve 23 is placed in position over the upper end of the casing and is then rotated to cause its threaded portion 23$^b$ to engage the internally threaded portion 24$^b$ of the lower casing. As the part 23$^b$ moves downwardly, the lower end thereof engages the split ring 26 and forces it downwardly along the annular inclined wedging surface 24$^d$ with the result that the ring bites into the rubber casing and establishes a rigid connection therewith at the same time that the two parts of the fitting are connected to each other.

The lower fitting 17 is illustrated particularly in Fig. 4, where it is shown as comprising an upper sleeve 28 and a lower sleeve 29 together with other parts hereinafter to be described. The sleeves 28 and 29 have adjacent portions 28$^e$ and 29$^a$ which are externally knurled for engagement by the fingers of the operator and the part 28$^a$ is internally threaded for engagement by the externally threaded upper projection 29$^b$ of the lower or outer sleeve. The upper sleeve 28 is provided at the upper end of the part 28$^a$ thereof with an internal annular inclined surface 28$^d$ which is beveled upwardly and inwardly for coaction with an annular split ring 30 which is similar in form to the ring shown in Fig. 3. As the lower surface 29 is threaded into the upper sleeve 28, the upper end of the extension 29$^b$ engages the split ring 30 and forces it upwardly and inwardly along the wedging surface 28$^d$ so that it bites into the rubber of the casing 16 and thus holds the casing firmly in position within the fitting. This split ring in this fitting, as in the fitting first described, acts also as a locking device to exert pressure on the contacting portions of the telescoping sleeves so that relative rotation thereof is not readily permitted. The sleeve 29 is provided at the lower end of the upper enlarged bore thereof with an annular shoulder 29$^f$ which may engage the lower end of the casing 16 and a similar shoulder is formed on one of the sleeves of the upper fitting 15 for the same purpose although this engagement is not essential since the resilient split rings 26 and 30 effectually resist any relative movement of the fittings with respect to the ends of the casing 16.

In order that the lower fitting 17 may allow the relative rotation of the casing 18 of the tool 19, this fitting 17 is provided with a relatively rotatable tubular extension 32 which fits over the lower part 29$^c$ of the lower sleeve and which is freely rotatable thereon. The tubular extension 32 is internally threaded at its lower end as shown at 32$^a$ for engagement with a part carried by the casing 18 of the tool and the upper end of this extension 32 is provided with a plurality of annularly spaced circular holes 32$^b$ in each of which there is mounted a spherical hard metal ball 33. These balls are adapted to engage an annular groove 29$^d$ which is formed in the lower part 29$^c$ of the lower sleeve. This groove is substantially semicircular in cross-section to conform to the curvature of the balls 33 and when these balls are in their inner positions engaging this groove, the extension 32 of the fitting is held in position on the sleeve 29 with its upper end engaging the annular shoulder 29$^e$ formed on the sleeve. The balls 33 are normally maintained in position to engage the groove 29$^d$ by a collar 34 which fits over the tubular extension 32 with its upper end abutting against the shoulder 29$^e$ and with its lower end engaged by a split resilient locking ring 35 which detachably engages an annular groove 32$^c$ formed in the outer surface of the extension 32. This construction permits the ready assembly or disassembly of the parts which provide the freely rotatable connection between the body of the fitting and the casing 18 of the tool and the tool with the tubular extension 32 attached may be readily disconnected from the sleeve 29 when the operator wishes to place the sleeves 28 and 29 upon a new casing 16.

Although one form of the invention has been shown and described by way of illustration, it will be understood that it may be constructed in various other embodiments within the scope of the appended claims.

I claim:

1. The combination with a casing, of a flexible shaft in said casing, a fitting having parts extending over said casing and detachably clamped thereon, said fitting comprising a projecting sleeve, a tubular extension fitting over said sleeve and rotatable thereon, said tubular extension having an internally threaded portion for connection with a tool casing, and means for securing said tubular extension against endwise movement on said sleeve.

2. The combination with a shaft casing, of a fitting having parts extending over said casing and detachably clamped thereon, said fitting comprising a projecting sleeve, a tubular extension fitting over said sleeve and rotatable thereon, said tubular extension having an internally threaded portion for connection with a tool casing, said sleeve having an annular groove within said tubular extension, said tubular extension having a plurality of apertures therethrough, balls mounted in said apertures to engage said groove, and means for retaining said balls in engagement with said groove.

3. The combination with a shaft casing, of a flexible shaft mounted in said casing and adapted to operate a tool, a fitting having parts extending over said casing and detachably clamped thereon, said fitting comprising a projecting sleeve, a tubular extension fitting over said sleeve and rotatable thereon, said tubular extension having an internally threaded portion for connection with a tool casing, said sleeve having an annular groove within said tubular extension, said tubular extension having a plurality of apertures therethrough, balls mounted in said apertures to engage said groove, a collar fitting over said tubular extension to hold said balls in engagement with said groove, and means for detachably holding said collar in position on said tubular extension.

4. The combination in a fitting for a shaft casing, of a projecting sleeve having an annular groove, a tubular extension rotatably mounted on said sleeve and having apertures therethrough, balls mounted in said apertures to engage said groove, a collar mounted on said tubular extension to retain said balls in said groove, said tubular extension having an annular groove at the end of said collar, and a resilient split ring engaging said last named groove.

HERMAN GOLDBERG.